US 8,912,691 B2

(12) United States Patent
Miyamoto et al.

(10) Patent No.: US 8,912,691 B2
(45) Date of Patent: Dec. 16, 2014

(54) ROTATING ELECTRICAL MACHINE COOLING SYSTEM

(71) Applicants: Tomohiko Miyamoto, Toyota (JP); Kenjiro Nagata, Okazaki (JP)

(72) Inventors: Tomohiko Miyamoto, Toyota (JP); Kenjiro Nagata, Okazaki (JP)

(73) Assignees: Toyota Jidosha Kabushiki Kaisha, Toyota-shi (JP); Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 13/773,991

(22) Filed: Feb. 22, 2013

(65) Prior Publication Data

US 2013/0213607 A1 Aug. 22, 2013

(30) Foreign Application Priority Data

Feb. 22, 2012 (JP) ................. 2012-036001

(51) Int. Cl.
  *F28D 21/00* (2006.01)
  *F16K 15/00* (2006.01)
  *B60K 11/02* (2006.01)
(52) U.S. Cl.
  CPC ............... *F28D 21/00* (2013.01); *B60K 11/02* (2013.01); *F16K 15/00* (2013.01)
  USPC .......... 310/16; 165/104.19; 137/511; 137/468
(58) Field of Classification Search
  CPC ............ F01M 1/02; F02B 67/04; F02B 67/06; F02B 67/08; F01P 5/10; F01P 5/12
  USPC ...... 123/196 AB, 198 C, 41.28, 41.29, 41.42, 123/41.47; 310/10, 16; 417/15, 410.1, 223; 165/104.19; 137/468, 511
  See application file for complete search history.

(56) References Cited

U.S. PATENT DOCUMENTS

| | | | |
|---|---|---|---|
| 6,786,183 B2 * | 9/2004 | Hoelle et al. ............... | 123/41.44 |
| 7,287,507 B2 * | 10/2007 | Futamura et al. ......... | 123/196 R |
| 7,946,389 B2 * | 5/2011 | Kakinami et al. ........... | 184/27.2 |
| 8,475,137 B2 * | 7/2013 | Kobayashi et al. ........ | 417/44.11 |
| 2004/0093149 A1 * | 5/2004 | Hara .............................. | 701/104 |
| 2009/0195093 A1 * | 8/2009 | Bandai et al. .................. | 310/54 |
| 2009/0232673 A1 * | 9/2009 | Reisch et al. ................. | 417/364 |

FOREIGN PATENT DOCUMENTS

| | | |
|---|---|---|
| JP | 2006-161851 A | 6/2006 |
| JP | 2011-000978 A | 1/2011 |

* cited by examiner

*Primary Examiner* — Noah Kamen
*Assistant Examiner* — Grant Moubry
(74) *Attorney, Agent, or Firm* — Gifford, Krass, Sprinkle, Anderson & Citkowski, P.C.

(57) ABSTRACT

A rotating electrical machine cooling system includes a cooling structure for a rotating electrical machine that is mounted on a hybrid vehicle, and a controller. The cooling structure includes a coolant discharge channel and a coolant supply channel through which a coolant is circulated between an oil pump unit and the interior of a case body that includes the rotating electrical machine therein. The cooling structure further includes a bypass flow channel that connects the oil pump unit and the interior of the case body with each other, and a relief valve that is provided in the bypass flow channel. The oil pump unit includes a mechanical oil pump and an electric oil pump.

3 Claims, 4 Drawing Sheets

ROTATING ELECTRICAL MACHINE COOLING SYSTEM

INCORPORATION BY REFERENCE

The disclosure of Japanese Patent Application Publication No. 2012-036001 filed on Feb. 22, 2012 including the specification, drawings and abstract is incorporated herein by reference in its entirety.

BACKGROUND OF THE INVENTION

1. Field of the Invention

The invention relates to a rotating electrical machine cooling system, and more particularly, to a rotating electrical machine cooling system capable of cooling a rotating electrical machine with the aid of a mechanical coolant pump and an electric coolant pump.

2. Description of Related Art

In a vehicle that is mounted with an engine and a rotating electrical machine, a so-called electric type oil pump (an electric oil pump) as well as a so-called mechanical type oil pump (a mechanical oil pump) is employed in order to cool the rotating electrical machine, an automatic transmission, and the like. The mechanical oil pump is driven by the engine. The electric oil pump is driven by a battery or the like even when the engine is stopped.

For example, in Japanese Patent Application Publication No. 2006-161851 (JP-2006-161851 A), there is described a configuration of a vehicular oil pressure supply device that is equipped with a mechanical oil pump and an electric oil pump. In this configuration, a check valve is provided between a discharge side of the mechanical oil pump and a discharge side of the electric oil pump in order to prevent hydraulic oil from flowing backward from the mechanical oil pump to the electric oil pump. Furthermore, an orifice and a relief valve are provided between a discharge-side oil channel and a suction-side oil channel, sequentially in the direction from the discharge-side oil channel to the suction-side oil channel. The discharge-side oil channel connects the discharge side of the mechanical oil pump and the discharge side of the electric oil pump with each other. The suction-side oil channel connects a suction side of the mechanical oil pump and a suction side of the electric oil pump with each other.

In Japanese Patent Application Publication No. 2011-978 (JP-2011-978 A), there is disclosed an auxiliary pump drive control device capable of driving an electric oil pump at low load even if the viscosity of oil becomes high when the temperature of outside air is low, in a vehicle that is equipped with a mechanical oil pump that is driven together with an engine, and the electric oil pump, which is an auxiliary pump that is driven by a pump drive source that is different from the engine. In this case, the mechanical oil pump and the electric oil pump are provided in parallel with each other between an oil pan as an oil store portion and a main discharge oil channel. A main check valve is provided between a discharge side of the mechanical oil pump and the main discharge oil channel. An auxiliary-side check valve is provided between a discharge side of the electric oil pump and the main discharge oil channel. In addition, apart from an auxiliary suction oil channel between a suction side of the electric oil pump and the oil pan, a subsidiary suction oil channel is provided between the discharge side of the electric oil pump and the oil pan via a check valve.

In addition, when the temperature of outside air is low, the electric oil pump is first reversely driven. Thus, high-viscosity oil that has remained in the auxiliary suction oil channel to become low in temperature is returned to the oil pan. Because the oil stored in the oil pan has been relatively warmed, the oil temperature rises in this oil pan. Besides, oil is sucked from the oil pan via the subsidiary suction oil channel by the electric oil pump, and is returned to the oil pan via the electric oil pump. This oil is sucked from the warmed oil pan, so that load on the electric oil pump can be kept low. By continuing this process, the oil temperature rises. After that, the electric oil pump is caused again to rotate positively. It is described in the aforementioned publication that the load of the electric oil pump can thus be lightened even when the temperature of outside air is low.

In the case where the mechanical oil pump and the electric oil pump are connected in parallel to each other to cool the rotating electrical machine, even when a check valve is provided between both the oil pumps, the coolant may flow backward if there is a certain relationship in magnitude between the discharge pressure of the mechanical oil pump and the discharge pressure of the electric oil pump. For example, when the coolant flows backward from the mechanical oil pump to the electric oil pump, the electric oil pump rotates reversely. Besides, the coolant that has flowed backward may leak out. When the electric oil pump rotates reversely, an electric motor that drives the electric oil pump rotates reversely to assume a regenerative state, so that a drive circuit of the rotating electrical machine may be damaged. Incidentally, when the coolant flows backward from the electric oil pump to the mechanical oil pump, the mechanical oil pump does not rotate reversely because it is connected to the engine. Besides, since the coolant that has flowed backward is returned from a suction port to a coolant reservoir, the coolant does not leak out either. As described hitherto, there is a problem in a structure in which only the check valve is employed in the case where the mechanical oil pump and the electric oil pump are connected in parallel to each other to cool the rotating electrical machine.

In order to avoid this problem, it is conceivable to perform control of driving only one of the mechanical oil pump and the electric oil pump such that the driving of the mechanical oil pump and the driving of the electric oil pump do not compete against each other. In this case, if only one of the oil pumps is driven, it may be impossible to supply a sufficient amount of the coolant for cooling the rotating electrical machine. If an attempt is made to sufficiently cool the rotating electrical machine by driving only one of the oil pumps, that one of the oil pumps is enlarged in size.

Besides, it is assumed that the temperature of the coolant is lowered by a heat exchanger such as an oil cooler or the like in the case where the mechanical oil pump and the electric oil pump are connected in parallel to each other to cool the rotating electrical machine. Then, the coolant flows via the oil cooler at the time of extremely low temperature as well, so that it is difficult to raise the temperature of the coolant. In general, at the time of low temperature, the temperature of the coolant is raised by operating the electric oil pump, which can be driven by a battery. In this situation, while the engine is stopped and the backflow of the coolant is prevented by a check valve, the electric oil pump can be operated. In this case as well, however, the coolant from the electric oil pump flows via the oil cooler. Therefore, the process of raising the temperature of the coolant is inefficient.

SUMMARY OF THE INVENTION

The invention provides a rotating electrical machine cooling system that can supply a sufficient amount of a coolant to a rotating electrical machine while preventing an adverse effects from occurring by the backflow of the coolant in the case where a mechanical coolant pump and an electric coolant pump are connected in parallel to each other to cool the rotating electrical machine. Besides, the invention provides a rotating electrical machine cooling system that makes it possible to swiftly raise the temperature of the coolant at the time of low temperature. The following means contribute to at least one of the above objectives.

A rotating electrical machine cooling system according to one aspect of the invention includes a motive power unit, a coolant reservoir, a mechanical coolant pump, an electric coolant pump, a bypass flow channel, and a relief valve. The motive power unit includes an internal combustion engine and a rotating electrical machine. In the coolant reservoir, a coolant for cooling the rotating electrical machine is stored. The mechanical coolant pump is driven by the internal combustion engine, sucks the coolant from the coolant reservoir, and discharges the coolant to a main discharge flow channel via a first check valve to supply the coolant to the rotating electrical machine. The electric coolant pump sucks the coolant from the coolant reservoir, is connected to the main discharge flow channel via a second check valve in parallel with the mechanical coolant pump, and discharges the coolant from a discharge port thereof to supply the coolant to the rotating electrical machine. The bypass flow channel branches off from a flow channel between the discharge port of the electric coolant pump and the second check valve, to supply the coolant to the rotating electrical machine. The relief valve is provided in the bypass flow channel and opens at a predetermined relief pressure.

Thus, a sufficient amount of the coolant can be supplied to the rotating electrical machine without causing the coolant to flow backward.

BRIEF DESCRIPTION OF THE DRAWINGS

Features, advantages, and technical and industrial significance of an exemplary embodiment of the invention will be described below with reference to the accompanying drawings, in which like numerals denote like elements, and wherein.

DETAILED DESCRIPTION OF EMBODIMENT

Figure 1:
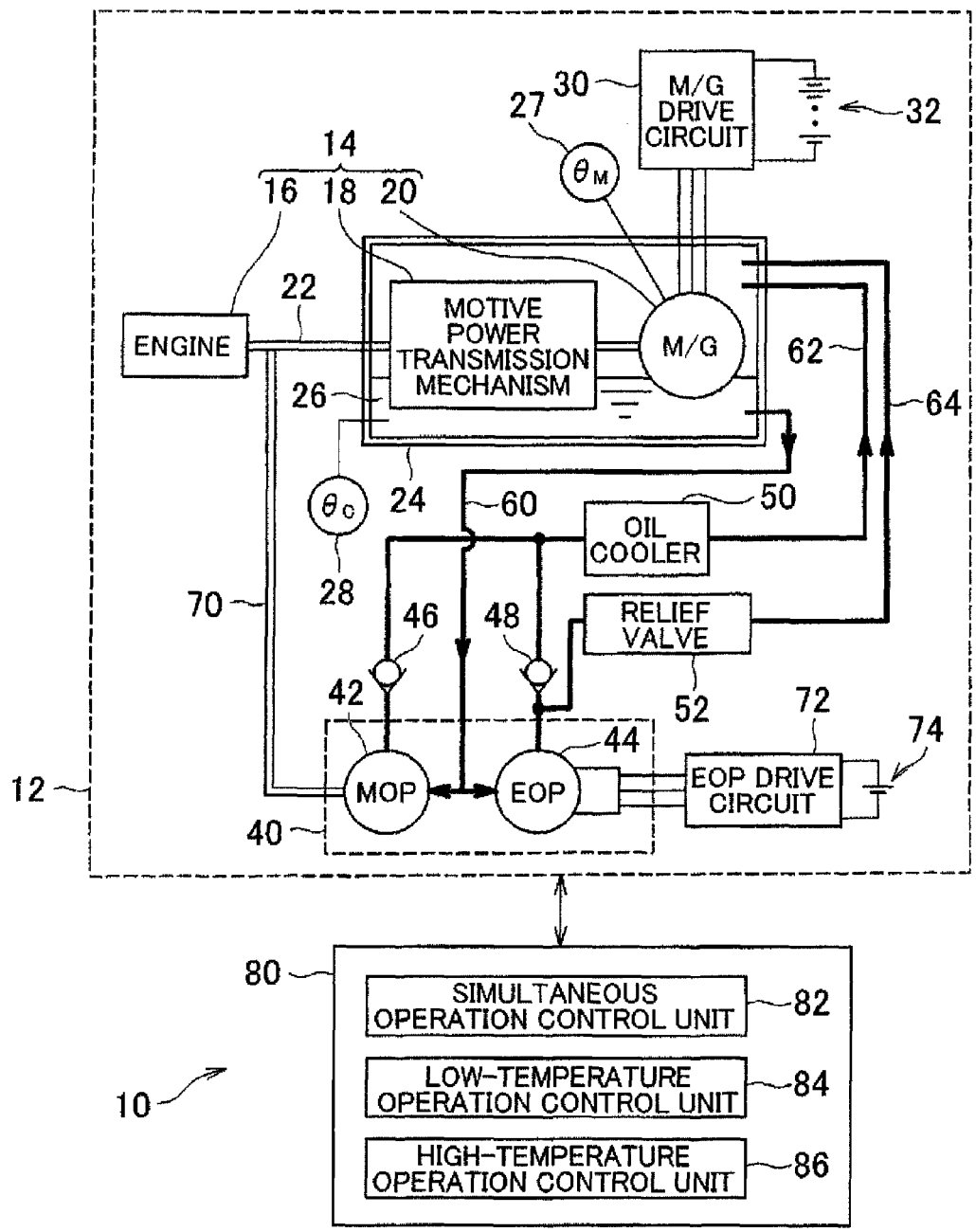
FIG. 1 is a view showing the configuration of a rotating electrical machine cooling system according to the embodiment of the invention.

The embodiment of the invention will be described hereinafter in detail using the drawings. A configuration having an engine, a rotating electrical machine, and a motive power transmission mechanism provided therebetween will be described hereinafter as a motive power unit. However, this configuration is an exemplification for illustrative purposes. In this case, it is sufficient that the configuration have an engine and a rotating electrical machine. The relationship between the output of the engine and the output of the rotating electrical machine can be appropriately changed in accordance with the specification of a vehicle. Besides, the description will be given on the assumption that the single rotating electrical machine is mounted on the vehicle. However, this configuration is also an exemplification. There may also be cases where a plurality of rotating electrical machines are mounted on the vehicle. For example, it is also acceptable to adopt a configuration in which a rotating electrical machine is used for driving and another rotating electrical machine is used for electric power generation. Separate rotating electrical machines may be used to drive front wheels and rear wheels respectively.

Besides, automatic transmission fluid (ATF), which is also used as a lubricating oil, will be described hereinafter as a coolant for cooling the rotating electrical machine. However, this configuration is an exemplification, and a cooling fluid other than ATF may be used instead. In this context, a coolant pump that circulates the coolant is mentioned as an oil pump. However, this mention is also adapted to a case where ATF is used.

Besides, a low-voltage power supply that is independent of a power supply device of the rotating electrical machine will be described as a power supply of the drive circuit of the electric oil pump. However, this configuration is an exemplification for illustrative purposes. For example, an electric power whose voltage has been converted into a low voltage may be supplied from the power supply device of the rotating electrical machine to the drive circuit of the electric oil pump.

Besides, the following description will be given on the assumption that the rotating electrical machine and the motive power transmission mechanism are accommodated in a single case body, and that the coolant circulates between the interior of a case and an oil pump unit. However, this configuration is an exemplification for illustrative purposes. For example, it is also acceptable to adopt a configuration in which the coolant circulates among the rotating electrical machine, the motive power transmission mechanism, and the oil pump unit, instead of putting the rotating electrical machine and the motive power transmission mechanism together into the single case.

In the following, like elements will be denoted by like reference symbols respectively in all the drawings, and redundant description will be omitted. Besides, in the description in the text, previously mentioned reference symbols are used according to need.

FIG. 1 is a view showing the configuration of a rotating electrical machine cooling system 10 for a rotating electrical machine that is mounted on a hybrid vehicle. This rotating electrical machine cooling system 10 is a system that includes a cooling structure 12 for a rotating electrical machine 20 that is mounted on a hybrid vehicle, and a controller 80.

The cooling structure 12 includes an engine 16, the rotating electrical machine 20, an M/G drive circuit 30, and a high-voltage power supply 32. The engine 16 and the rotating electrical machine 20 constitute a motive power unit 14 as a drive source of the hybrid vehicle. The rotating electrical machine 20 is shown as an M/G in FIG. 1. The M/G drive circuit 30 is connected to the rotating electrical machine 20. The high-voltage power supply 32 is a power supply of the M/G drive circuit 30. The cooling structure 12 further includes an oil pump unit 40, a bypass flow channel 64, and a relief valve 52. The oil pump unit 40 supplies a coolant 26 into a case body 24 through circulation. The case body 24 includes the rotating electrical machine 20 therein. The bypass flow channel 64 connects the oil pump unit and the interior of the case body 24 with each other. The relief valve 52 is provided in the bypass flow channel 64. The oil pump unit 40 is configured to include a mechanical oil pump 42 and an electric oil pump 44. The mechanical oil pump 42 is shown as MOP in FIG. 1. The electric oil pump 44 is shown as EOP in FIG. 1.

The motive power unit 14 is configured to include the engine 16, the rotating electrical machine 20, and a motive power transmission mechanism 18. The motive power transmission mechanism 18 is provided between the engine 16 and the rotating electrical machine 20. The engine 16 is an internal combustion engine. Besides, the rotating electrical machine 20 is a motor-generator (an M/G) that is mounted on a hybrid vehicle. The rotating electrical machine 20 functions as a motor when it is supplied with electric power from the M/G drive circuit 30. The rotating electrical machine 20 functions as an electric power generator when it is driven by the engine 16 or when the hybrid vehicle is braked. The rotating electrical machine 20 is a three-way synchronous rotating electrical machine.

The rotating electrical machine 20 is provided with a temperature detector 27. The temperature detector 27 is rotating electrical machine temperature detection means for detecting a temperature $\theta_M$ of the rotating electrical machine 20. Data detected by the temperature detector 27 are transmitted to the controller 80 with the aid of a suitable signal line (not shown).

The motive power transmission mechanism 18 has a function of distributing motive power to be supplied to the hybrid vehicle between an output of the engine 16 and an output of the rotating electrical machine 20. A planetary gear mechanism can be employed as the motive power transmission mechanism 18. The planetary gear mechanism is connected to three shafts, namely, an output shaft 22 of the engine 16, an output shaft of the rotating electrical machine 20, and an output shaft that is connected to an axle (not shown). A shaft that connects the motive power transmission mechanism 18 and the engine 16 to each other in FIG. 1 is the output shaft 22 of the engine 16. The output shaft 22 is connected to a drive shaft of the mechanical oil pump 42 via a connection shaft 70. In addition, the output shaft 22 is used to drive the mechanical oil pump 42.

The M/G drive circuit 30 is a circuit including an inverter. The inverter carries out electric power conversion between direct-current electric power of the high-voltage power supply 32 and alternating-current electric power for driving the rotating electrical machine 20. The inverter is a circuit that generates a three-phase drive signal through pulse width modulation (PWM) control for appropriately adjusting the timings at which a plurality of switching elements are turned on/off, and supplies the three-phase drive signal to the rotating electrical machine 20. PWM control is performed to modulate the width of a pulse through a comparison between a fundamental wave signal and a carrier signal. The fundamental wave signal has a period corresponding to a rotation period of the rotating electrical machine 20. The carrier signal has a sawtooth waveform. The inverter renders the rotating electrical machine 20 in a desired working state through this PWM control.

The high-voltage power supply 32 is a rechargeable high-voltage secondary battery. More specifically, the high-voltage power supply 32 can be configured as a lithium-ion battery pack having a terminal voltage that ranges from about 200 V to about 300 V. The battery pack is designed to obtain the aforementioned predetermined terminal voltage by combining a plurality of batteries called single cells or battery cells, whose terminal voltage ranges from 1 V to several V. Moreover, a nickel hydride battery pack, a large-capacity capacitor, or the like can be employed as the high-voltage power supply 32.

The case body 24 is a housing that includes the motive power transmission mechanism 18 and the rotating electrical machine 20 therein. The coolant 26 is stored in an inner space of the case body 24. The coolant 26 lubricates a movable region of the rotating electrical machine 20 and the motive power transmission mechanism 18. Besides, the coolant 26 cools the rotating electrical machine 20 and the motive power transmission mechanism 18. A lubricating oil called automatic transmission fluid (ATF) can be used as the coolant.

The case body 24 is provided with a temperature detector 28. The temperature detector 28 is a coolant temperature detector that detects a temperature $\theta_C$ of the coolant 26. Data detected by the temperature detector 28 are transmitted to the controller 80 with the aid of a suitable signal line (not shown).

The oil pump unit 40 is a unit that includes the mechanical oil pump 42 and the electric oil pump 44. The oil pump unit 40 is a coolant pump unit that supplies the coolant 26 into the inner space of the case body 24 through circulation. A coolant discharge channel 60 is a pipe through which the coolant flows. The coolant discharge channel 60 connects a coolant discharge port and the oil pump unit 40 with each other. The coolant discharge port is provided through the case body 24 on a lower side thereof along the gravitational direction, namely, at a spot close to a bottom portion of the case body 24. A coolant supply channel 62 is a pipe through which the coolant flows. The coolant supply channel 62 connects the oil pump unit 40 and a coolant supply port with each other. The coolant supply port is provided through the case body 24 on an upper side thereof along the gravitational direction, namely, at a spot close to a ceiling portion of the case body 24. An oil cooler 50 is a heat exchanger. The oil cooler 50 lowers the temperature of the coolant 26 through the use of air or water.

The mechanical oil pump 42 is a mechanical coolant pump. A drive shaft of the mechanical oil pump 42 is connected to the output shaft 22 of the engine 16 via the connection shaft 70. Besides, the mechanical oil pump 42 is driven when the engine 16 operates. That is, the driving of the mechanical oil pump 42 starts when the engine 16 is started, and ends when the engine 16 is stopped.

The electric oil pump 44 is an electric coolant pump. The electric oil pump 44 is driven by an EOP drive circuit 72 under a control signal from the controller 80. The EOP drive circuit 72 is supplied with direct-current electric power from a low-voltage power supply 74. The low voltage means a voltage that is lower than the voltage of the high-voltage power supply 32. For example, a voltage ranging from about 12 V to about 16 V can be used. A three-phase synchronous motor can be employed as a motor that rotates a drive shaft of the electric oil pump 44. In this case, the EOP drive circuit 72 is configured to include an inverter. The inverter has a direct-current/alternating-current conversion function. Besides, the output of the electric oil pump 44 can be made variable by changing the on/off duty ratio in PWM control of the inverter.

A single-phase alternating-current motor can also be employed instead of the three-phase synchronous motor. Alternatively, a direct-current motor can also be employed instead of the three-phase synchronous motor. The contents of the EOP drive circuit 72 are changed in accordance with the type of a motor that is employed to rotate the drive shaft of the electric oil pump 44.

The mechanical oil pump 42 and the electric oil pump 44 are connected in parallel to each other between the coolant discharge channel 60 and the coolant supply channel 62. A check valve 46 is a valve that is provided to prevent the coolant 26 from flowing backward between the mechanical oil pump 42 and the coolant supply port of the case body 24. By the same token, a check valve 48 is a valve that is provided to prevent the coolant 26 from flowing backward between the electric oil pump 44 and the coolant supply port of the case body 24.

The bypass flow channel 64 connects the oil pump unit 40 and the interior of the case body 24 with each other. The bypass flow channel 64 is a flow channel that bypasses the coolant supply channel 62. More specifically, the bypass flow channel 64 is a pipe through which the coolant flows and which branches off from between the discharge port of the electric oil pump 44 and the check valve 48 and leads to the interior of the case body 24 in the coolant supply channel 62 that extends from the discharge port of the electric oil pump 44 to the interior of the case body 24 via the check valve 48. That is, the bypass flow channel 64 branches off from a flow channel that connects the discharge port of the electric oil pump 44 and the check valve 48 with each other, and leads to the interior of the case body 24.

The relief valve 52 is provided in series with the bypass flow channel 64. The relief valve 52 is a fluid valve that opens at a predetermined relief pressure. The details of the predetermined relief pressure will be described later.

The controller 80 has a function of controlling the aforementioned respective elements as a whole. However, in this case in particular, the controller 80 has a function of effectively operating the mechanical oil pump 42 and the electric oil pump 44 through the effective use of the function of the relief valve 52. This controller 80 can be configured as a computer that is suited to be mounted on a hybrid vehicle.

The controller 80 is configured to include a simultaneous operation control unit 82, a low-temperature operation control unit 84, and a high-temperature operation control unit 86. The simultaneous operation control unit 82 performs control of simultaneously operating the mechanical oil pump 42 and the electric oil pump 44 so as to prevent the coolant 26 from flowing backward. The low-temperature operation control unit 84 performs control for raising the temperature $\theta_C$ of the coolant 26 at the time of low temperature. The high-temperature operation control unit 86 performs control of increasing the supply amount of the coolant 26 at the time of high temperature. These functions can be realized by executing software. More specifically, these functions can be realized by executing an oil pump control program.

Figure 2:
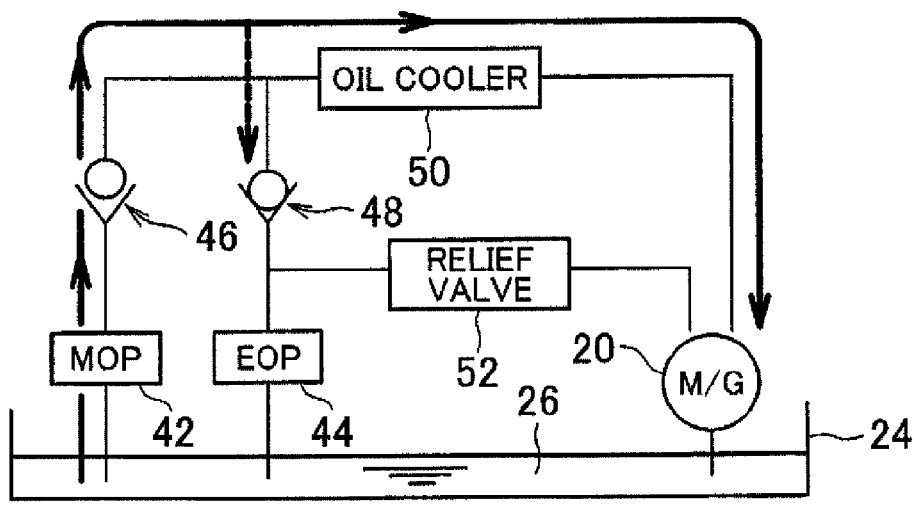
FIG. 2 is a schematic view showing how a coolant flows when an MOP is operated and an EOP is not operated, in the rotating electrical machine cooling system according to the embodiment of the invention.
Figure 3:
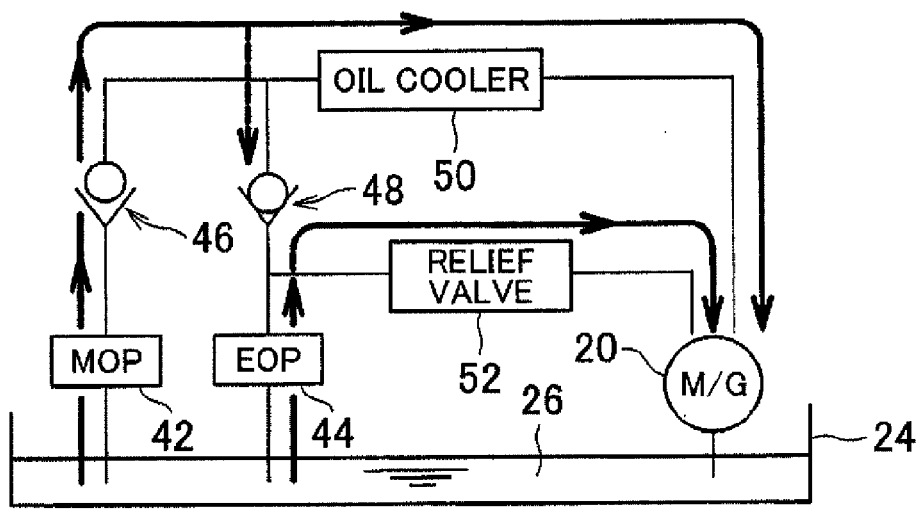
FIG. 3 is a schematic view showing how the coolant flows when the MOP and the EOP are simultaneously operated, in the rotating electrical machine cooling system according to the embodiment of the invention.
Figure 4:
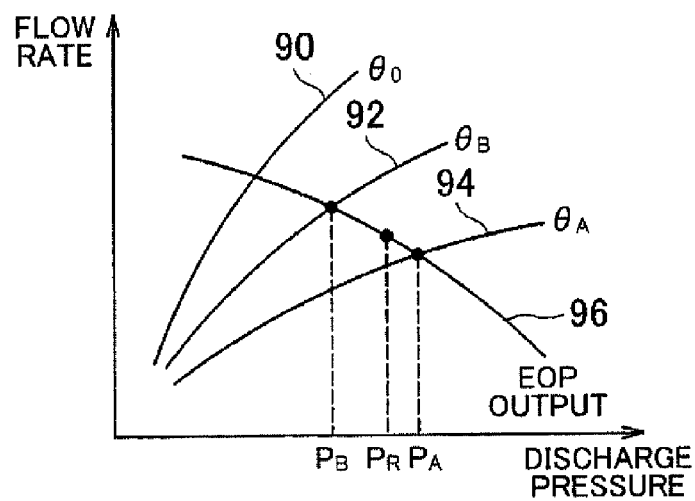
FIG. 4 is a view illustrating how the discharge pressure changes in accordance with the temperature of the coolant, in the rotating electrical machine cooling system according to the embodiment of the invention.
Figure 5:
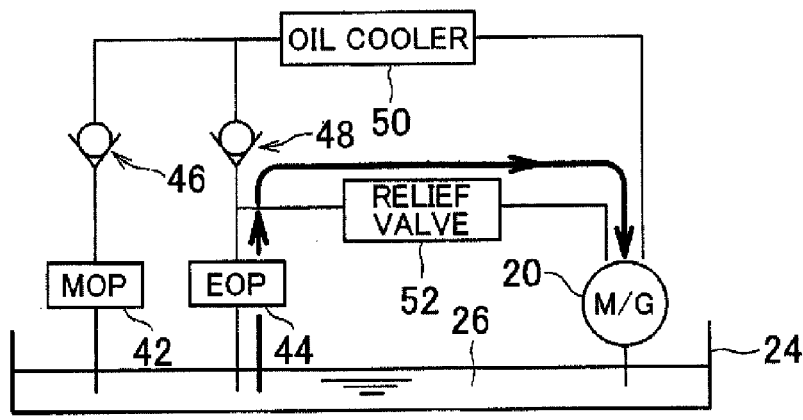
FIG. 5 is a schematic view showing how the coolant flows when only the EOP is operated while the temperature of the coolant is low, in the rotating electrical machine cooling system according to the embodiment of the invention.
Figure 6:
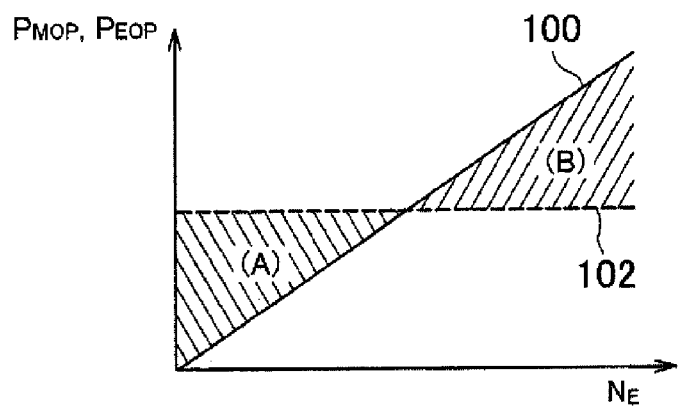
FIG. 6 is a view showing how the discharge pressure of the MOP and the discharge pressure of the EOP are related to the rotational speed of an internal combustion engine, when the MOP and the EOP are simultaneously operated in the rotating electrical machine cooling system according to the embodiment of the invention.
Figure 7:
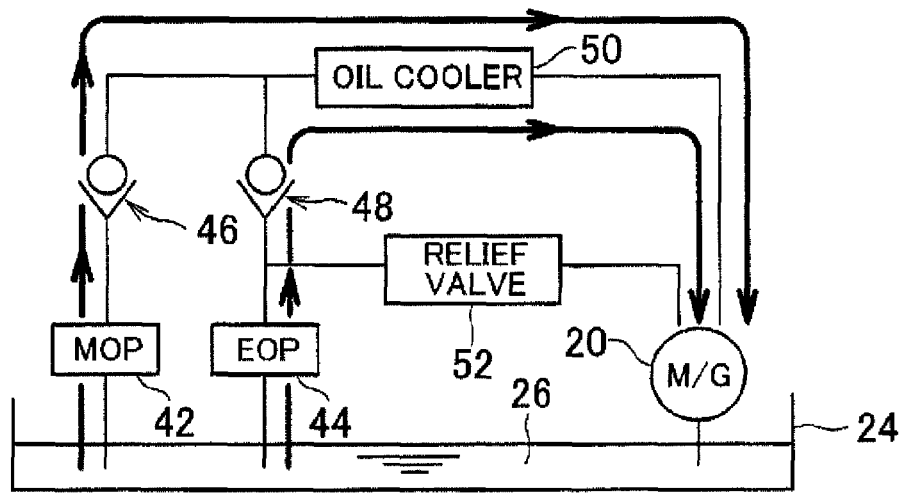
FIG. 7 is a schematic view showing how the coolant flows in a working range (A) in FIG. 6.
Figure 8:
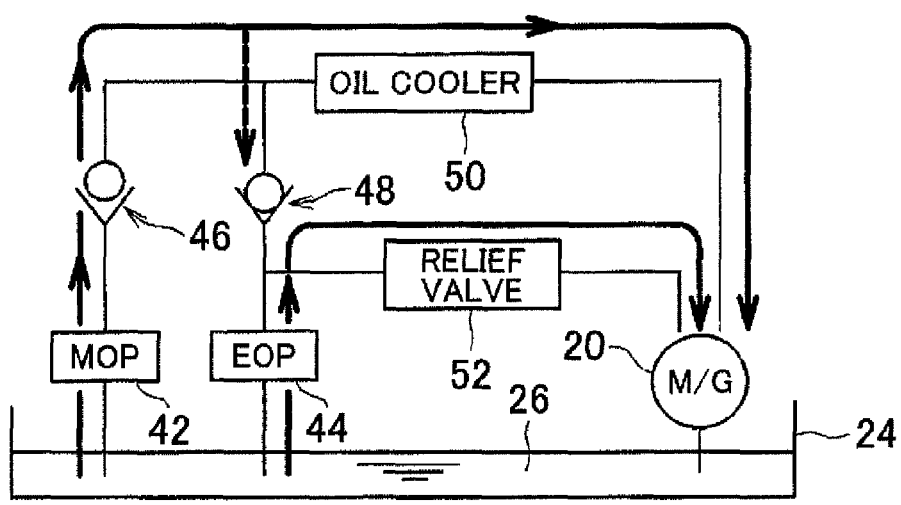
FIG. 8 is a schematic view showing how the coolant flows in a working range (B) in FIG. 6.

The operation of the aforementioned configuration will be described in detail using FIG. 2 and the subsequent drawings. FIGS. 2 and 3 are schematic views showing how the coolant 26 flows under the control at a normal temperature. FIGS. 4 and 5 are views illustrating the control performed at the time of low temperature. FIGS. 6 to 8 are views illustrating the control performed at the time of high temperature.

It should be noted herein that FIGS. 2, 3, 5, 7, and 8 are schematic views showing, the mechanical oil pump 42, the electric oil pump 44, the oil cooler 50, the relief valve 52, the rotating electrical machine 20, and the coolant flow channels that connect these components with one another. In this case, the interior of the case body 24 is schematically shown like an oil pan in which the coolant 26 is stored. In that sense, the interior of the case body 24 in which the coolant 26 is stored is a coolant reservoir. These drawings are schematic views showing how the coolant 26 flows, namely, that the coolant 26 is pumped up from the coolant reservoir by the mechanical oil pump 42 and the electric oil pump 44, is supplied to the rotating electrical machine 20 through appropriate coolant flow channels, and is returned to the coolant reservoir again.

FIG. 2 is a view showing how the coolant 26 flows when the mechanical oil pump 42 is in operation and the electric oil pump 44 is out of operation. This state is equivalent to a time when the engine 16 is in operation and the electric oil pump 44 is stopped. At this time, the check valve 46 opens, and the check valve 48 is closed due to a discharge pressure resulting from the operation of the mechanical oil pump 42. Thus, the coolant 26 does not flow from the mechanical oil pump 42 into the electric oil pump 44. The coolant 26 pumped up from the coolant reservoir by the mechanical oil pump 42 passes through the oil cooler 50 to be lowered in temperature, and is supplied to the rotating electrical machine 20 to cool the rotating electrical machine 20. The warmed coolant 26 is returned to the coolant reservoir. This process is repeated, and the coolant 26 is caused to circulate by the mechanical oil pump 42.

FIG. 3 is a view showing how the coolant 26 flows when the electric oil pump 44 is also operated in addition to the state of FIG. 2. In this case, the mechanical oil pump 42 and the electric oil pump 44 simultaneously operate. This control is performed through the function of the simultaneous operation control unit 82 of the controller 80. More specifically, a drive command is issued to the EOP drive circuit 72 while the engine 16 is in operation.

When the rotational speed of the engine 16 is sufficiently high, the discharge pressure of the mechanical oil pump 42 is higher than the discharge pressure of the electric oil pump 44, and therefore, the check valve 48 remains closed. Even if the electric oil pump 44 is operated at this time, the coolant 26 pumped up from the coolant reservoir by the electric oil pump 44 is not supplied to the rotating electrical machine 20 via the check valve 48. It should be noted herein that the relief pressure is set such that the relief valve 52 opens at the discharge pressure of the electric oil pump 44. Thus, the coolant 26 pumped up from the coolant reservoir by the electric oil pump 44 flows to the rotating electrical machine 20 via the relief valve 52. In this manner, the relief valve 52 is provided between the discharge port of the electric oil pump 44 and the rotating electrical machine 20, whereby the mechanical oil pump 42 and the electric oil pump 44 can be simultaneously operated while preventing the coolant 26 from flowing backward.

Next, a method of raising the temperature $\theta_C$ of the coolant 26 at the time of low temperature through the use of the operation of the relief valve 52 will be described using FIGS. 4 and 5.

FIG. 4 is a view showing a load resistance characteristic curve of the coolant 26, and an output characteristic curve of the electric oil pump 44. The load resistance characteristic curve and the output characteristic curve will now be described.

Given that the temperature $\theta_C$ of the coolant 26 used for the electric oil pump 44 is constant, a discharge pressure P needs to be raised in order to increase a flow rate Q. In this manner, the characteristic according to which the flow rate Q of the coolant 26 flowing through the flow channels increases as the discharge pressure P rises is the load resistance characteristic curve of the coolant 26. In FIG. 4, curves indicated by $\theta_0$, $\theta_A$, and $\theta_B$ are load resistance characteristic curves. When the temperature $O_C$ of the coolant 26 changes, the load resistance characteristic curve changes. The flow rate Q under the same discharge pressure P decreases as the temperature $\theta_C$ lowers.

In FIG. 4, a central temperature of an appropriate range of the temperature $\theta_C$ of the coolant 26 is denoted by $\theta_0$, a lower-limit temperature of the appropriate range is denoted by $\theta_B$, and a temperature lower than $\theta_B$ with higher viscosity is denoted by $\theta_A$. That is, there is established a relationship: $\theta_0 > \theta_B > \theta_A$. It should be noted herein that the temperature $\theta_B$ is lower than the temperature $\theta_0$. A load resistance characteristic curve 92 at the temperature $\theta_B$ is located on a lower flow rate side than a load resistance characteristic curve 90 at the temperature $\theta_0$ when a comparison is made therebetween at the same discharge pressure P. Besides, the temperature $\theta_A$ is lower than the temperature $\theta_B$. A load resistance characteristic curve 94 at the temperature $\theta_A$ is located on a lower flow rate side than the load resistance characteristic curve 92 at the temperature $\theta_B$ when a comparison is made therebetween at the same discharge pressure P.

On the other hand, given that the condition for driving the electric oil pump 44 is constant, namely, that the output of the electric oil pump 44 is constant, the flow rate Q increases as the load of the flow channels through which the coolant 26 flows decreases. Since the load of the flow channels is indicated by the discharge pressure P, the flow rate Q increases as the discharge pressure P decreases. In this manner, the characteristic according to which the flow rate Q of the coolant 26 flowing through the flow channels increases as the discharge pressure P decreases is the output characteristic curve of the electric oil pump 44. A characteristic curve indicated as EOP output in FIG. 4 is an output characteristic curve 96.

A working point at the time when the coolant 26 is delivered with the aid of the electric oil pump 44 is determined by the discharge pressure P and the flow rate Q at intersecting points between the load resistance characteristic curves 90, 92, and 94 that are determined by the temperature $\theta_C$ of the coolant 26, and the output characteristic curve 96 that is determined by the condition for driving the electric oil pump 44. In FIG. 4, a discharge pressure $P_B$ at the intersecting point between the load resistance characteristic curve 92 and the output characteristic curve 96, and a discharge pressure $P_A$ at the intersecting point between the load resistance characteristic curve 94 and the output characteristic curve 96 are shown. The discharge pressure $P_B$ is a lower-limit discharge pressure of the electric oil pump 44 at the time when the temperature $\theta_C$ of the coolant 26 is equal to the lower-limit temperature $B_B$ of the appropriate range. The discharge pressure $P_A$ is a discharge pressure threshold of the electric oil pump 44 at the time when the temperature $\theta_C$ of the coolant 26 is equal to the threshold temperature $\theta_A$, which is lower than the temperature $\theta_B$ and is determined as a temperature at or below which the electric oil pump 44 is not used. The discharge pressure threshold $P_A$ is higher than the discharge pressure $P_B$.

FIG. 5 is a schematic view showing how the coolant 26 flows during the control at the time when the temperature $\theta_C$ of the coolant 26 is lower than the lower-limit temperature $\theta_B$ of the appropriate range. In this case, as the control of swiftly raising the temperature $\theta_C$ of the coolant 26, the engine 16 is stopped, and the mechanical oil pump 42 is thereby stopped from being operated. Then, the electric oil pump 44 is activated. This processing procedure is carried out through the function of the low-temperature operation control unit 84 of the controller 80.

It should be noted herein that a relief pressure $P_R$ at which the relief valve 52 opens is set to an appropriate value that is higher than the lower-limit discharge pressure $P_B$ described with reference to FIG. 4 and lower than the discharge pressure threshold $P_A$. That is, there is established a relationship: $P_B < P_R < P_A$. For example, after confirming that the relief pressure $P_R$ assumes a value higher than the lower-limit discharge pressure $P_B$, the relief pressure $P_R$ can be set equal to $0.9 P_A$. The relief pressure $P_R$ may be set to a value other than this value. Incidentally, the setting of $P_B < P_R < P_A$ causes no problem in operation control described with reference to FIG. 3.

In the case where the relief pressure $P_R$ is thus set, even when the temperature $\theta_C$ of the coolant 26 is lower than the lower-limit temperature $\theta_B$ of the appropriate range, the relief valve 52 opens as long as the discharge pressure at that time is higher than the relief pressure $P_R$. That is, the relief valve opens when the temperature $\theta_C$ of the coolant 26 is a low temperature within a range from the lower-limit temperature $\theta_B$ of the appropriate range to the threshold temperature $\theta_A$. When the relief valve 52 opens, the coolant 26 pumped up from the coolant reservoir by the electric oil pump 44 does not flow via the check valve 48, but is supplied to the rotating electrical machine 20 through the relief valve 52. The coolant 26 supplied to the rotating electrical machine 20 is returned to the coolant reservoir. This process is repeated to circulate the coolant 26.

At this time, the coolant 26 passing through the relief valve 52 does not pass through the oil cooler 50. Besides, since the mechanical oil pump 42 is stopped, the coolant 26 is not supplied to the rotating electrical machine 20 via the oil cooler 50. Accordingly, the coolant 26 supplied to the rotating electrical machine 20 is not lowered in temperature by the oil cooler 50. In this manner, the relief valve 52 is provided between the electric oil pump 44 and the rotating electrical machine 20. In other words, the relief valve 52 is provided in the bypass flow channel 64 that branches off from the coolant supply channel 62 between the electric oil pump 44 and the check valve 48. Accordingly, the coolant 26 can be directly supplied to the rotating electrical machine 20 via the bypass flow channel 64 and the relief valve 52, without the intervention of the supply flow channel 62 as a main discharge flow channel. Thus, the temperature of the coolant 26 can be swiftly raised at the time of low temperature.

Next, a method of increasing the amount of the coolant 26 supplied to the rotating electrical machine 20 at the time of high temperature through the use of the operation of the relief valve 52 will be described using FIGS. 6 to 8. In FIG. 6, the axis of abscissa represents a rotational speed $N_E$ of the engine 16, and the axis of ordinate represents a discharge pressure $P_{MOP}$ of the mechanical oil pump 42 or a discharge pressure $P_{EOP}$ of the electric oil pump 44. FIG. 6 is a view showing how the discharge pressures $P_{MOP}$ and $P_{EOP}$ are related to the rotational speed $N_E$ of the engine 16 when the mechanical oil pump 42 and the electric oil pump 44 are simultaneously operated.

A characteristic curve 100 of the discharge pressure $P_{MOP}$ of the mechanical oil pump 42 indicates a characteristic according to which the discharge pressure $P_{MOP}$ increases as the rotational speed $N_E$ of the engine 16 increases. On the other hand, a characteristic curve 102 of the discharge pressure $P_{EOP}$ of the electric oil pump 44 indicates a constant characteristic regardless of the rotational speed $N_E$ of the engine 16. It should be noted herein that the mechanical oil pump 42 and the electric oil pump 44 are simultaneously operated. It is then understood that two working ranges (A) and (B) are distinguished from each other as to a relationship in magnitude between the discharge pressures $P_{MOP}$ and $P_{EOP}$. The working range (A) is a working range in which the discharge pressure $P_{EOP}$ of the electric oil pump 44 is higher than the discharge pressure $P_{MOP}$ of the mechanical oil pump 42. The working range (B) is a working range in which the discharge pressure $P_{MOP}$ of the mechanical oil pump 42 is higher than the discharge pressure $P_{EOP}$ of the electric oil pump 44.

When the amount of the coolant 26 supplied to the rotating electrical machine 20 is desired to be increased at the time of high temperature, the control of simultaneously operating the mechanical oil pump 42 and the electric oil pump 44 is performed. This processing procedure is carried out through the function of the high-temperature operation control unit 86 of the controller 80. Incidentally, the control of simultaneously operating the mechanical oil pump 42 and the electric oil pump 44 includes the contents described with reference to FIG. 3. In this sense, therefore, the function of the high-temperature operation control unit 86 includes part of the function of the simultaneous operation control unit 82.

FIG. 7 is a view showing how the coolant 26 flows within the working range (A) when the mechanical oil pump 42 and the electric oil pump 44 are simultaneously operated in order to increase the amount of the coolant 26 supplied to the rotating electrical machine 20. In this case, the discharge pressure $P_{EOP}$ of the electric oil pump 44 is higher than the discharge pressure $P_{MOP}$ of the mechanical oil pump 42. Accordingly, the check valve 48 provided at the discharge port of the electric oil pump 44 opens. The check valve 46 provided at the discharge port of the mechanical oil pump 42 is somewhat pushed back due to the discharge pressure $P_{EOP}$, but is open due to the discharge pressure $P_{MOP}$.

In this manner, in the working range (A), the coolant 26 flows through the two check valves 46 and 48. At this time, the discharge pressure $P_{EOP}$ of the electric oil pump 44 is higher than the discharge pressure $P_{MOP}$ of the mechanical oil pump 42. Therefore, the coolant 26 does not flow backward from the mechanical oil pump 42 to the electric oil pump 44. Accordingly, a deterioration in an electric oil pump system and the like do not result from the backflow of the coolant 26. The coolant 26 flows backward from the electric oil pump 44 to the mechanical oil pump 42. However, since the mechanical oil pump 42 is connected to the engine 16, the mechanical oil pump 42 does not rotate reversely due to the backflow of the coolant 26. The coolant 26 that has flowed backward is then returned from a suction port of the mechanical oil pump 42 to the coolant reservoir. Accordingly, the mechanical oil pump 42 is not adverse effects due to the backflow of the coolant 26.

Accordingly, in the working range (A), the coolant 26 from the electric oil pump 44 as well as the coolant 26 from the mechanical oil pump 42 is supplied to the rotating electrical machine 20 via the oil cooler 50. Thus, the amount of the coolant 26 supplied to the rotating electrical machine 20 can be made larger than in the case where only the mechanical oil pump 42 is operated.

FIG. 8 is a view showing how the coolant 26 flows within the working range (B) when the mechanical oil pump 42 and the electric oil pump 44 are simultaneously operated in order to increase the amount of the coolant 26 supplied to the rotating electrical machine 20. In this case, the discharge pressure $P_{MOP}$ of the mechanical oil pump 42 is higher than the discharge pressure $P_{EOP}$ of the electric oil pump 44. Thus, the check valve 48 provided at the discharge port of the electric oil pump 44 is closed. In this state, which is the same as in FIG. 3, the relief valve 52 opens. Accordingly, as described with reference to FIG. 3, the coolant 26 pumped up from the coolant reservoir by the electric oil pump 44 is supplied to the rotating electrical machine 20 through the relief valve 52. The coolant 26 is supplied from the mechanical oil pump 42 to the rotating electrical machine 20 via the oil cooler 50. Thus, the amount of the coolant 26 supplied to the rotating electrical machine 20 can be made larger than in the case where only the mechanical oil pump 42 is operated.

In this manner, the relief valve 52 is provided between the electric oil pump 44 and the rotating electrical machine 20. Thus, even when the mechanical oil pump 42 and the electric oil pump 44 are simultaneously operated, the amount of the coolant 26 supplied to the rotating electrical machine 20 can be increased without allowing any damage to be caused by the backflow of the coolant 26. In the foregoing, the time of high temperature has been described as a case where the amount of the coolant 26 is increased. However, the mechanical oil pump 42 and the electric oil pump 44 may be simultaneously operated even in the case where the amount of the coolant 26 is desired to be increased except at the time of high temperature.

The rotating electrical machine cooling system according to the invention can be utilized for a hybrid vehicle that is mounted with a mechanical oil pump and an electric oil pump.

While the disclosure has been explained in conjunction with the specific exemplary embodiment thereof, it is evident that many alternatives, modifications, and variations will be apparent to those skilled in the art. Accordingly, the exemplary embodiment of the disclosure as set forth herein is intended to be illustrative, not limiting. There are changes that may be made without departing from the scope of the disclosure.

What is claimed is:

1. A rotating electrical machine cooling system comprising:
    a motive power unit that includes an internal combustion engine and a rotating electrical machine;
    a coolant reservoir in which a coolant for cooling the rotating electrical machine is stored;
    a mechanical coolant pump that is driven by the internal combustion engine, sucks the coolant from the coolant reservoir, and discharges the coolant to a main discharge flow channel via a first check valve to supply the coolant to the rotating electrical machine;
    an electric coolant pump that sucks the coolant from the coolant reservoir, is connected to the main discharge flow channel via a second check valve in parallel with the mechanical coolant pump, and discharges the coolant from a discharge port of the electric coolant pump to supply the coolant to the rotating electrical machine;
    a bypass flow channel that branches off from a flow channel between the discharge port of the electric coolant pump and the second check valve, to supply the coolant to the rotating electrical machine; and
    a relief valve that is provided in the bypass flow channel and opens at a predetermined relief pressure.

2. The rotating electrical machine cooling system according to claim 1, wherein
    the relief valve opens at a relief pressure that is set as a discharge pressure between a discharge pressure of the coolant at a time when a temperature of the coolant is equal to a lower-limit temperature of a suitable temperature range and a discharge pressure threshold at a threshold temperature of the coolant that is lower than the lower-limit temperature of the suitable temperature range.

3. The rotating electrical machine cooling system according to claim 2, wherein
the main discharge flow channel is provided with a heat exchanger that lowers a temperature of the coolant, and
the mechanical coolant pump is stopped and the electric coolant pump is operated to supply the coolant to the rotating electrical machine via the relief valve without intervention of the heat exchanger, when the temperature of the coolant is lower than a suitable temperature.

* * * * *